United States Patent [19]
Choi et al.

[11] Patent Number: 6,054,554
[45] Date of Patent: Apr. 25, 2000

[54] SOLUBLE POLYIMIDE RESIN COMPRISING POLYALICYCLIC STRUCTURE

[75] Inventors: Kil Yeong Choi; Mi Hie Yi, both of Daejong, Rep. of Korea; Wenxi Huang, Changchun, China

[73] Assignee: Korea Research Institute of Chemical Technology, Rep. of Korea

[21] Appl. No.: 09/306,757

[22] Filed: May 7, 1999

[30]     Foreign Application Priority Data

May 8, 1998  [KR]   Rep. of Korea ................. 98-16568

[51] Int. Cl.[7] ............................. C08G 73/10; C08G 69/26
[52] U.S. Cl. ................... 528/353; 528/125; 528/128; 528/171; 528/172; 528/173; 528/174; 528/175; 528/179; 528/183; 528/185; 528/188; 528/220; 528/229; 528/350; 528/351
[58] Field of Search ............................ 528/125, 128, 528/171, 172, 173, 174, 175, 179, 183, 185, 188, 220, 229, 350, 351, 353

[56]     References Cited
        U.S. PATENT DOCUMENTS

| | | | |
|---|---|---|---|
| 5,466,732 | 11/1995 | Tomioka et al. | 524/606 |
| 5,554,684 | 9/1996 | Choi et al. | 524/606 |
| 5,604,041 | 2/1997 | Choi | 428/473.5 |

*Primary Examiner*—P. Hampton-Hightower
*Attorney, Agent, or Firm*—Finnegan, Henderson, Farabow, Garrett & Dunner, LLP

[57]     ABSTRACT

The invention herein relates to a novel soluble polyimide resin comprising polyalicyclic structures and the process of preparation of the same, wherein aromatic tetracarboxylic dianhydride and novel aromatic diamine having an polyalicyclic group with various structures are used to yield a novel form of a polyimide resin, which has superior heat-resistance, solubility, and transparency.

More specifically, the invention herein relates to a novel polyimide resin having excellent heat-resistance and solubility, which is prepared by means of reacting diamine monomers having a novel chemical structure with various types of aromatic carboxilic dianhydrides, in stead of aromatic diamine used for the preparation of the conventional polyimide resin. As a result, the polymers so obtained had the glass transition temperature of 260° C.~410° C. and showed a increase in solubility in proportion to the increase in a number of the aromatic rings between two phenyl groups. Further, the polymers herein showed superior solubility at room temperature in various types of organic solvents, e.g., m-cresol, N-methylpyrrolidone or dimethylacetamide.

6 Claims, No Drawings

SOLUBLE POLYIMIDE RESIN COMPRISING POLYALICYCLIC STRUCTURE

FIELD OF THE INVENTION

The invention herein relates to a novel soluble polyimide resin comprising polyalicyclic structure and the process of preparation of the same, wherein aromatic tetracarboxylic dianhydride and novel aromatic diamine having an alicyclic group with various structures are used to yield a novel form of a polyimide resin having the repetitive unit of the formula 1 as below, which has superior heat-resistance, solubility, and transparency:

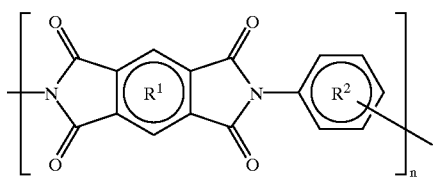
(1)

wherein:

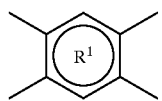

represents one or more of tetravalent groups selected from the following:

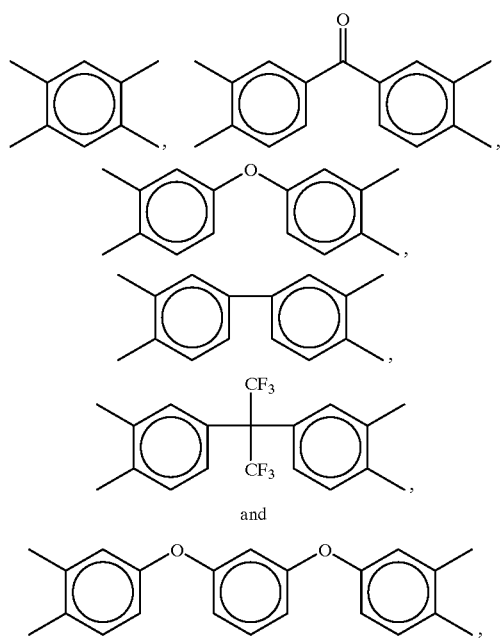

and

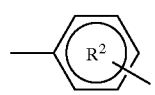

must include one or more of dianiline group comprising several polyalicyclic structure as represented by

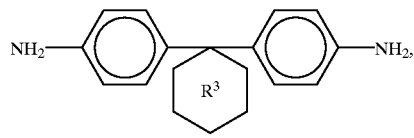

and may contain the following bivalent group,

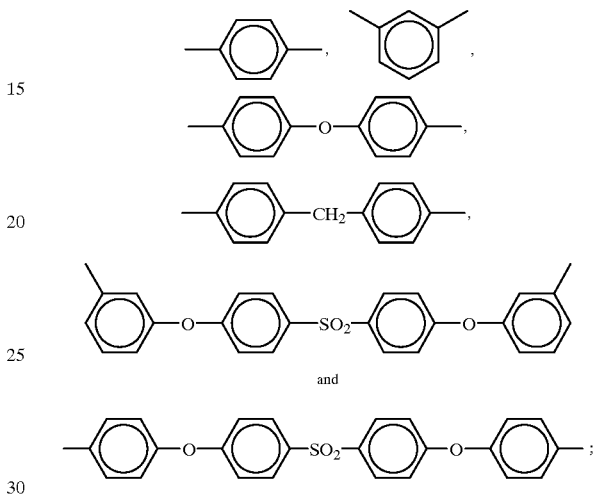

and

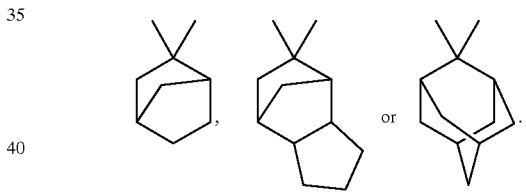

wherein, $R^3$ represents

BACKGROUND OF THE INVENTION

In general, a polyimide (hereinafter referred to as "PI") resin denotes a high heat-resistant resin which is manufactured by condensation polymerization of aromatic tetracarboxylic acid or the derivatives thereof with aromatic diamine, or aromatic diisocyanate followed by imidization. However, the PI resin is insoluble in solvent and non-fusible by heat.

Further, the PI resin can have a variety of molecular structures depending on the types of the monomers thereof. As for the aromatic tetracarboxylic acid constituent, pyromellitic dianhydride (PMDA) or biphenyltetracarboxylic dianhydride (BPDA) are used herein. As for the aromatic diamine constituent, oxydianiline (ODA) or p-phenylene diamine (p-PDA) are used for condensation polymerization. The typical PI resin has a repetitive unit of the following formula 10:

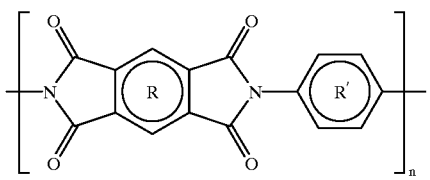

The PI resin with the formula 10 as repetitive unit is high heat-resistant, insoluble, and non-fusible with the following properties:

(1) excellent thermal oxidative property;
(2) superior heat-resistance in terms of using temperature, i.e., 260° C. for a long-term use, and 480° C. for a short-term use;
(3) excellent electric and mechanical properties
(4) excellent radiation resistance and low temperature properties;
(5) intrinsic non-combustible properties; and,
(6) excellent chemical-resistant properties.

In spite of the fact that the PI resin with formula 10 as repetitive unit possesses an excellent heat resistance property, the processing therein is extremely difficult due to insolubility and non-melting property.

To overcome the shortcomings of the PI resin, several methods have been devised: a) method of introducing polar groups into the backbone or side chains of the polymer, b) method of introducing the connecting groups or pendant groups with a large volume into the polymer, and c) method of enhancing the flexibility of the backbone of the polymer.

In particular, as part of research to enhance the solubility of the PI resin, T. Kurosaki et al. reported a method of preparing a soluble PI resin using alicyclic anhydride as a monomer (Macromolecules, 1994, 27, 1117 and 1993, 26, 4961) Also, Qn Jin et al. disclosed in 1993 a method of preparing a soluble PI resin using the cyclic diamine (J.P.S. Part A. Polym. Chem. Ed., 31, 2345~2351).

The soluble PI resins as modified by the aforementioned methods have improved the solubility due to enhanced flexibility of the chains. However, the actual use thereof seems to be problematic since the high thermal stability and mechanical characteristics, which are advantages of the conventional PI resin, are seriously affected thereby.

And the soluble PI resin (Matrimid 5218) made by Ciba Geigy Co. showed excellent heat-resistance and solubility by introducing trimethylindane group into the main chain. However, the actual use thereof seems go be problematic since monomers containing trimethylindane group must be prepared through many steps.

To overcome such shortcomings, the inventors herein have for several years conducted intensive studies to improve the solubility and melting property of the polyamideimide resin, a typical thermoplastic and high heat-resistance resin, for improvement in the processability of the conventional aromatic high heat-resistance polymers. As a result, the inventors have discovered that the solubility of a polymer can be significantly enhanced by introducing isophorone diamine (hereinafter referred to as "IPDA"), an aliphatic diamine compound containing trimethylcyclohexyl group, into the backbone of polymer (U.S. Pat. No. 5,521,276).

Further, the inventors have endeavored to prepare a soluble PI resin containing IPDA moiety with better heat resistance than the conventional PI resin. As a result, the inventors have succeeded in preparing PI resin with enhanced heat resistance and solubility using aromatic diamine compounds containing cyclohexylidene group with various structures of substituted alkyl groups as the monomers (Korean Patent Application No. 97-2811 and Korean Patent Application No. 97-21577).

Based on the above studies, the inventors have significantly increased the solubility and heat resistance of a polymer by introducing polyalicyclic structures instead of alkyl group substituted cyclohexylidene group, which is a connecting group between the two phenyl groups.

SUMMARY OF THE INVENTION

The inventors have completed this invention based on the manufacture of a novel PI resin with excellent heat resistance and solubility in such a manner that instead of aromatic diamine used for the manufacture of the conventional PI resin, aromatic diamine with a novel structure is introduced therein. Thereafter, such compound is reacted with various types of aromatic tetracarboxylic dianhydrides.

Therefore, the objective of this invention is to provide a novel soluble PI resin with excellent processability such as solubility and moldability while maintaining the basic properties of the conventional PI resin, which may be used as a core heat-resistance material in a variety of advanced industries such as electronics and aerospace.

DETAILED DESCRIPTION OF PREFERRED EMBODIMENTS

The invention herein is characterized by a polyimide resin having the following formula 1 as repetitive unit:

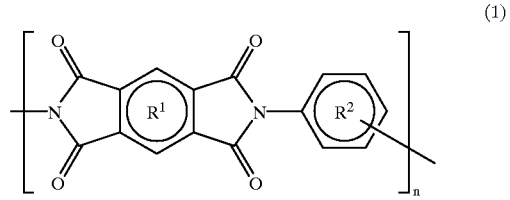

wherein

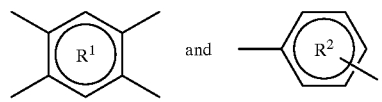

have been previously defined.

Further, the invention herein relates to a process of manufacturing a polyimide resin having aforementioned formula 1 as repetitive unit, derived from solution polymerization of aromatic tetracarboxylic dianhydride and aromatic diamine compounds.

With respect to the above manufacturing process, said aromatic tetracarboxylic dianhydride may include one or more aromatic tetracarboxylic dianhydride of the following group consisting of pyromellitic dianhydride (PMDA), benzophenonetetraboxylic dianhydride (BTDA), oxydiphthalic dianhydride (ODPA), biphenyltetracarboxylic dianhydride (BPDA), hexafluoroisopropylidene diphthalic dianhydride (6FDA), and hydroquinonebisphthalic dianhydride (HQDPA).

As for said aromatic diamine compound, it contains one or more of substituted cyclohexylidenedianiline derivatives of formula 2 as an essential component and may contain one or more compounds selected from the group consisting of oxydianiline, methylene dianiline, metabisaminophenoxy diphenylsulfone, and parabisaminophenoxy diphenylsulfone.

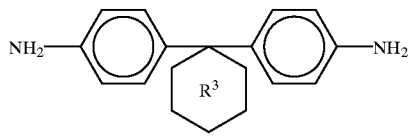

(2)

wherein: $R^3$ represents

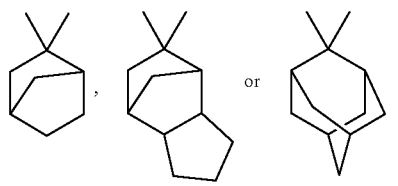

The invention herein is explained in more detail as set forth hereunder.

The invention herein relates to a PI resin and the process of the preparation thereof, having substituted cyclohexylidenedianiline derivatives of the formula 2 such as as 2,2-bis(4-aminophenyl)norbonane (BANB), 8,8-bis(4-aminophenyl)tricyclo(5,2,1,0$^2$,6)decane (BATC), 2,2-bis(4-aminophenyl)adamantane (BAAD) as an essential component, and the repetitive unit of formula 1. The aromatic diamine monomer of formula 2 is a novel compound.

The PI resin of the invention herein has a weight average molecular weight (MW) of about 50,000~200,000 g/mol. The inherent viscosity thereof is in the range of 0.2~1.1 dL/g. The glass transition temperature (Tg) thereof is in the range of 260~410° C.

Also, the PI resin under said invention is easily dissolvable at room temperature not only in aprotic polar solvents such as dimethylacetamide (DMAc), dimethylformamide (DMF), N-methyl-2-pyrrolidone (NMP), but also in organic solvents such as m-cresol. At room temperature, it demonstrates a high solubility of more than 10 wt % in a solvent having a low boiling point, such as tetrahydrofuran (THF) and chloroform, and in a low water absorptive solvent such as γ-butyrolactone.

The following examples illustrate various aspects of the invention herein but are not to be construed to limit the claims in any manner whatsoever.

PREPARATIVE EXAMPLE 1

Preparation of 2,2-bis(4-aminophenyl)norbonane (BANB)

In a 550 ml reactor equipped with a mechanical stirrer, thermometer, dropping funnel and condenser, 2-norbonanone 17.6 g (0.16 mole) was dissolved in 45 g of aniline (0.48 mole). Thereafter, aniline hydrogen chloride 41.5 g (0.32 mole) was slowly added to the reacting mixture. Further, with the temperature increased up to 160° C., the reacting mixture was stirred for 20 hours. After the reaction was completed, the mixture was cooled to the room temperature and controlled pH 10 by adding NaOH aqueous solution. The excess aniline was removed by distillation and the resultant was recrystallized from ethylacetate to yield a white crystal 15 g (yield: 35.2%).

PREPARATIVE EXAMPLE 2

Preparation of 8,8-bis(4-aminophenyl)tricyclo(5,2,1, 0$^2$,6) decane (BATC)

In the same procedure as described in the preparative example 1, the reaction was carried out, using tricyclo(5,2,1,0$^2$,6)decanone instead of 2-norbonanone to yield diamine of high purity (yield: more than 40%).

PREPARATIVE EXAMPLE 3

Preparation of 2,2-bis(4-aminophenyl)adamantane (BAAD)

In the same procedure as described in the preparative example 1, the reaction was carried out, using 2-adamantanone instead of 2-norbonanone to yield yellow crystal of high purity (yield: 35%).

EXAMPLE 1

To a 50 ml reactor equipped with a mechanical stirrer, thermometer, nitrogen-inlet, dropping funnel and condenser, nitrogen gas was slowly influxed as 2,2-bis(4-aminophenyl) norbonane (hereinafter referred to as "BANB": 2.78 g, 0.01 mole) was dissolved in 36 ml of m-cresol. Thereafter, pyromellitic dianhydride (hereinafter referred to as "PMDA": 2.18 g, 0.01 mole) in solid phase was slowly added to the reacting mixture. At this point, the solid content was fixed to 7~15 wt %. After the reaction temperature was increased to 70~90° C., mixture was reacted for 2 hours. Further, the reaction mixture was heated at reflux for 6~12 hours. During these reactions, isoquinoline (1~5 wt %) was employed as a catalyst. After the reaction was completed, the reaction mixture was triturated with excess amount of methanol (hereinafter referred to as "MeOH") using a waring blender. The polymer was washed with water and MeOH several times and was dried under reduced pressure at 120° C. to yield a novel PI resin (hereinafter referred to as "P-1"). The yield of polymerization was quantitative. The inherent viscosity measured in m-cresol at 30° C. at the concentration of 0.5 g/dL was 0.88 dL/g.

EXAMPLE 2

A mixture of 8,8-bis(4-aminophenyl)tricyclo(5,2,1,0$^2$,6) decane (hereinafter referred to as "BATC": 3.18 g, 0.01 mole) and PMDA (2.18 g, 0.01 mole) was dissolved in m-cresol and using the same procedure as described in the example 1, a PI resin (hereinafter referred to as "P-2") was synthesized. The PI resin so prepared was dissolved in m-cresol at the concentration of 0.5 g/dL, and the inherent viscosity measured at 30° C. was 0.33 dL/g.

EXAMPLE 3

A mixture of 2,2-bis(4-aminophenyl)adamantane (hereinafter referred to as "BAAD": 3.48 g, 0.01 mole) and PMDA (2.18 g, 0.01 mole) was dissolved in m-cresol, and using the same procedure as described in the example 1, a PI resin (hereinafter referred to as "P-3") was synthesized. The PI resin so prepared was dissolved in m-cresol at the concentration of 0.5 g/dL, and the inherent viscosity measured at 30° C. was 0.37 dL/g.

EXAMPLE 4

A mixture of BANB (2.78 g, 0.01 mole) and biphenyltetracarboxylic dianhydride (2.94 g, 0.01 mole) was dissolved in m-cresol, and using the same procedure as described in the example 1, a PI resin (hereinafter referred to as "P-4") was synthesized. The PI resin so prepared was dissolved in m-cresol at the concentration of 0.5 g/dL, and the inherent viscosity measured at 30° C. was 1.02 dL/g.

EXAMPLE 5

A mixture of BATC (3.18 g, 0.01 mole) and BPDA (2.94 g, 0.01 mole) was dissolved in m-cresol, and using the same procedure as described in the example 1, a PI resin (hereinafter referred to as "P-5") was synthesized. The PI resin so prepared was dissolved in m-cresol at the concentration of 0.5 g/dL, and the inherent viscosity measured at 30° C. was 0.35 dL/g.

EXAMPLE 6

A mixture of BAAD (3.48 g, 0.01 mole) and BPDA (2.94 g, 0.01 mole) was dissolved in m-cresol, and using the same procedure as described in the example 1, a PI resin (hereinafter referred to as "P-6") was synthesized. The PI resin so prepared was dissolved in m-cresol at the concentration of 0.5 g/dL, and the inherent viscosity measured at 30° C. was 0.44 dL/g.

EXAMPLE 7

A mixture of BANB (2.78 g, 0.01 mole) and benzophenonetetracarboxylic dianhydride (hereinafter referred to as "BTDA": 3.38 g, 0.01 mole) was dissolved in m-cresol, and using the same procedure as described in the example 1, a PI resin (hereinafter referred to as "P-7") was synthesized. The PI resin so prepared was dissolved in m-cresol at the concentration of 0.5 g/dL, and the inherent viscosity measured at 30° C. was 0.92 dL/g.

EXAMPLE 8

A mixture of BATC (3.18 g, 0.01 mole) and BTDA (3.38 g, 0.01 mole) was dissolved in m-cresol, and using the same procedure as described in the example 1, a PI resin (hereinafter referred to as "P-8") was synthesized. The PI resin so prepared as dissolved in m-cresol at the concentration of 0.5 g/dL, and the inherent viscosity measured at 30° C. was 0.29 dL/g.

EXAMPLE 9

A mixture of BAAD (3.48 g, 0.01 mole) and BTDA (3.38 g, 0.01 mole) was dissolved in m-cresol, and using the same procedure as described in the example 1, a PI resin (hereinafter referred to as "P-9") was synthesized. The PI resin so prepared was dissolved in m-cresol at the concentration of 0.5 g/dL, and the inherent viscosity measured at 30° C. was 0.52 dL/g.

EXAMPLE 10

A mixture of BANB (2.78 g, 0.01 mole) and hexafluoroisopropylidenediphthalic anhydride (hereinafter referred to as "6FDA": 4.60 g, 0.01 mole) was dissolved in m-cresol, and using the same procedure as described in the example 1, a PI resin (hereinafter referred to as "P-10") was synthesized. The PI resin so prepared was dissolved in m-cresol at the concentration of 0.5 g/dL, and the inherent viscosity measured at 30° C. was 0.59 dL/g.

EXAMPLE 11

A mixture of BATC (3.18 g, 0.01 mole) and 6FDA (4.60 g, 0.01 mole) was dissolved in m-cresol, and using the same procedure as described in the example 1, a PI resin (hereinafter referred to as "P-11") was synthesized. The PI resin so prepared as dissolved in m-cresol at the concentration of 0.5 g/dL, and the inherent viscosity measured at 30° C. was 0.21 dL/g.

EXAMPLE 12

A mixture of BAAD (3.48 g, 0.01 mole) and 6FDA (4.60 g, 0.01 mole) was dissolved in m-cresol, and using the same procedure as described in the example 1, a PI resin (hereinafter referred to as "P-12") was synthesized. The PI resin so prepared was dissolved in m-cresol at the concentration of 0.5 g/dL, and the inherent viscosity measured at 30° C. was 0.34 dL/g.

EXAMPLE 13

A mixture of BANB (2.78 g, 0.01 mole) and oxydiphthalic anhydride (hereinafter referred to as "ODPA": 3.26 g, 0.01 mole) was dissolved in m-cresol, and using the same procedure as described in the example 1, a PI resin (hereinafter referred to as "P-13") was synthesized. The PI resin so prepared was dissolved in m-cresol at the concentration of 0.5 g/dL, and the inherent viscosity measured at 30° C. was 0.87 dL/g.

EXAMPLE 14

A mixture of BATC (3.18 g, 0.01 mole) and ODPA (3.26 g, 0.01 mole) was dissolved in m-cresol, and using the same procedure as described in the example 1, a PI resin (hereinafter referred to as "P-14") was synthesized. The PI resin so prepared was dissolved in m-cresol at the concentration of 0.5 g/dL, and the inherent viscosity measured at 30° C. was 0.30 dL/g.

EXAMPLE 15

A mixture of BAAD (3.48 g, 0.01 mole) and ODPA (3.26 g, 0.01 mole) was dissolved in m-cresol, and using the same procedure as described in the example 1, a PI resin (hereinafter referred to as "P-15") was synthesized. The PI resin so prepared was dissolved in m-cresol at the concentration of 0.5 g/dL, and the inherent viscosity measured at 30° C. was 0.43 dL/g.

EXAMPLE 16

A mixture of BANB (2.78 g, 0.01 mole) and hydroquinonediphthalic anhydride (hereinafter referred to as "HQDPA": 4.02 g, 0.01 mole) was dissolved in m-cresol, and using the same procedure as described in the example 1, a PI resin (hereinafter referred to as "P-16") was synthesized. The PI resin so prepared was dissolved in m-cresol at the concentration of 0.5 g/dL, and the inherent viscosity measured at 30° C. was 0.90 dL/g.

EXAMPLE 17

A mixture of BATC (3.18 g, 0.01 mole) and HQDPA (4.02 g, 0.01 mole) was dissolved in m-cresol, and using the same procedure as described in the example 1, a PI resin (hereinafter referred to as "P-17") was synthesized. The PI resin so prepared was dissolved in m-cresol at the concentration of 0.5 g/dL, and the inherent viscosity measured at 30° C. was 0.38 dL/g.

EXAMPLE 18

A mixture of BAAD (3.48 g, 0.01 mole) and HQDPA (4.02 g, 0.01 mole) was dissolved in m-cresol, and using the same procedure as described in the example 1, a PI resin (hereinafter referred to as "P-18") was synthesized. The PI resin so prepared was dissolved in m-cresol at the concentration of 0.5 g/dL, and the inherent viscosity measured at 30° C. was 0.49 dL/g.

COMPARATIVE EXAMPLE

In the same procedure as described in the example 1, the reaction was carried out, but the PI resin (hereinafter referred to as "P-19") was synthesized in such a manner that 2,2-bis(4-aminophenyl)cyclohexane (hereinafter referred to as "BACH": 2.66 g, 0.01 mole) was reacted with the PMDA (2.18 g, 0.01 mole). The PI resin so prepared was precipitated as a solid form during the reaction, but its insolubility to m-cresol made the measurement of the inherent viscosity unavailable.

EXPERIMENTAL EXAMPLE 1

Measurement of Molecular Weight

As for the PI resins prepared in the examples 1~18 and a comparative example, the experimental results on the inherent viscosity and film-forming property by solvent casting are shown in the following table 1.

TABLE 1

| Polymer | Inherent viscosity (dL/g) | Film Property |
|---|---|---|
| Example 1 (P-1) | 0.88 | Tough |
| Example 2 (P-2) | 0.33 | Tough |
| Example 3 (P-3) | 0.37 | Tough |
| Example 4 (P-4) | 1.02 | Tough |
| Example 5 (P-5) | 0.35 | Tough |
| Example 6 (P-6) | 0.44 | Tough |
| Example 7 (P-7) | 0.92 | Tough |
| Example 8 (P-8) | 0.29 | Tough |
| Example 9 (P-9) | 0.52 | Tough |
| Example 10 (P-10) | 0.59 | Tough |
| Example 11 (P-11) | 0.21 | Brittle |
| Example 12 (P-12) | 0.34 | Tough |
| Example 13 (P-13) | 0.87 | Tough |
| Example 14 (P-14) | 0.30 | Tough |
| Example 15 (P-15) | 0.43 | Tough |
| Example 16 (P-16) | 0.90 | Tough |
| Example 17 (P-17) | 0.38 | Tough |
| Example 18 (P-18) | 0.49 | Tough |
| Comparative Example (P-19) | — | — |

The PI resins prepared in the examples 1~18 were all amorphous and transparent. The inherent viscosities of PI resins measured in m-cresol were in the range of 0.2~1.1 dL/g. Further, the processability of films prepared by solution casting seemed to be excellent. In other words, the aromatic diamine monomers of formula 2 having the bended structure could become polymers with high molecular weights by one-step polyimidization at high temperature. However, P-11 shows brittle property because of low molecular weight.

By contrast, the PI resin prepared in the comparative example had poor solubility so that the measurement of inherent viscosity in m-cresol was impossible.

EXPERIMENTAL EXAMPLE 2

Thermal Analysis

To evaluate the thermal property of the respective PI resins prepared in the examples 1~18 and a comparative example, the glass transition temperature and thermal decomposition temperature were measured.

Using the differential scanning calorimeter (DSC), the glass transition temperature was measured based on the secondary heat trace of the DSC measurements with a heating rate of 10° C./min under nitrogen atmosphere. And the thermal decomposition temperature was measured by thermogravimetric analysis (TGA) with a heating rate of 10° C./min under nitrogen atmosphere.

TABLE 2

| | Glass Transition Temperature (° C.) | | | | | |
|---|---|---|---|---|---|---|
| | PMDA | BPDA | BTDA | 6FDA | ODPA | HQDPA |
| BACH | — | — | 305 | 293 | 290 | 261 |
| BANB | — | 405 | 347 | 332 | 296 | 284 |
| BATC | — | — | — | 324 | 313 | 296 |
| BAAM | — | — | 363 | 349 | 331 | 299 |

As noted in the above table 2, the novel polymers prepared from this invention usually demonstrated a higher glass transition temperature (Tg) of 260~410° C. although some differences were observed depending on the types of anhydride and substituent. Considering the fact that a typical aromatic PI resin, such as Kapton™ has the glass transition temperature of about 380° C., it can be said that this invention is of great significance.

In other words, it is advantage for process that the PI resin of the invention herein demonstrated short-term heat resistance property which was not inferior to that of Kapton™. More specifically, the pre-imidized PI resin of the invention herein does not require the post-imidization reaction. Further, since the processing temperature can be lowered to the solvent-evaporating temperature (less than 200° C.), the thermal deterioration of peripheral parts may be prevented. Further, the PI resin of the invention herein is effective in reducing voids formation at high temperature, which may contribute much to the expanded application of the PI resin in future.

EXPERIMENTAL EXAMPLE 3

Solubility

The solubility of the respective PI resins prepared in the examples 1~18 and a comparative example is represented in the following table 3. The organic solvent used are m-cresol, N-methyl-2-pyrrolidone (NMP), dimethylacetamide (DMAc), dimethylsulfoxide (DMSO), 1,1,2,2-tetrachloroethane (TCE), chloroform (CHCl$_3$), tetrahydrofuran (THF) and acetone.

TABLE 3

| Polymer | m-cresol | NMP | DMAc | DMSO | TCE | CHCl₃ | THF | Acetone | m-cresol/CHCl₃ |
|---|---|---|---|---|---|---|---|---|---|
| P-1 | ++ | ++ | ++ | + | ++ | +− | −− | − | ++ |
| P-2 | ++ | ++ | ++ | + | ++ | +− | +− | − | ++ |
| P-3 | ++ | ++ | ++ | + | ++ | +− | +− | − | ++ |
| P-4 | ++ | ++ | ++ | ++ | ++ | ++ | +− | − | ++ |
| P-5 | ++ | ++ | ++ | ++ | ++ | ++ | +− | − | ++ |
| P-6 | ++ | ++ | ++ | ++ | ++ | ++ | +− | − | ++ |
| P-7 | ++ | ++ | ++ | ++ | ++ | ++ | +− | − | ++ |
| P-8 | ++ | ++ | ++ | ++ | ++ | ++ | +− | − | ++ |
| P-9 | ++ | ++ | ++ | ++ | ++ | ++ | +− | − | ++ |
| P-10 | ++ | ++ | ++ | ++ | ++ | ++ | ++ | − | ++ |
| P-11 | ++ | ++ | ++ | ++ | ++ | ++ | ++ | − | ++ |
| P-12 | ++ | ++ | ++ | ++ | ++ | ++ | ++ | − | ++ |
| P-13 | ++ | ++ | ++ | + | ++ | ++ | ++ | − | ++ |
| P-14 | ++ | ++ | ++ | ++ | ++ | ++ | ++ | − | ++ |
| P-15 | ++ | ++ | ++ | ++ | ++ | ++ | ++ | − | ++ |
| P-16 | ++ | ++ | ++ | ++ | ++ | ++ | ++ | − | ++ |
| P-17 | ++ | ++ | ++ | ++ | ++ | ++ | ++ | − | ++ |
| P-18 | ++ | ++ | ++ | ++ | ++ | ++ | ++ | − | ++ |
| P-19 | +− | − | − | − | ++ | − | − | − | − |

++: soluble,
+: soluble on heating,
+−: partially soluble,
−: insoluble

As noted in the above table 3, the PI resin of said invention exhibited excellent solubility behavior toward various organic solvents.

The PI resin with rigid structure derived from PMDA was easily dissolved in aprotic polar solvents, such as NMP, DMAc and DMF and partially dissolved in common organic solvents such as THF at room temperature. And the solubility of the PI resin increased as the flexibility of the acid dianhydride increased.

The most of PI resins prepared from various kind of dianhydrides of said invention showed enhanced solubility. This novel feature is of great importance in expanding the applicability of the PI resins. More specifically, in the case where the PI resin of adhesive material, the fabrication of an PI adhesive layer with completely imidized form at less than 200° C. is available due to its excellent solubility. Further, during the adhesion process via heating, the void formation can be reduced. Therefore, the PI resin of said invention may be used as a liquid crystal alignment layer or soluble photosensitive PI resin.

Since the PI resin of the invention herein has the following advantages in that the heat resistance property thereof is excellent with superior solubility and melting property, it may be widely used to heat-resistant and insulating layers in electronics requiring a low-temperature processing, as well as to various hi-tech heat-resistant materials.

What is claimed is:

1. A polyimide resin comprising the following formula 1 as repetitive unit:

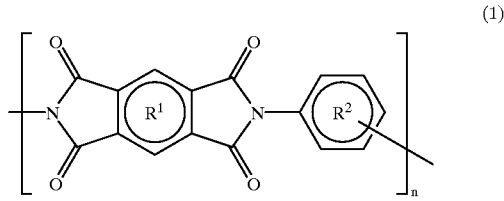

wherein

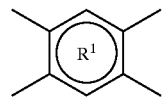

represents one or more of tetravalent groups selected from the following:

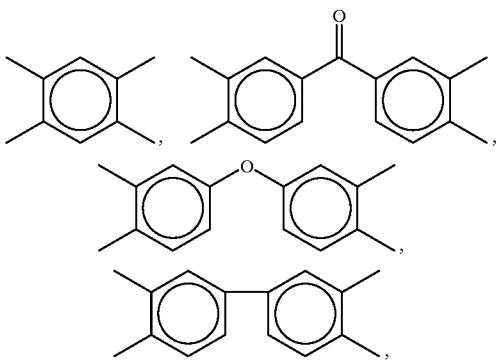

-continued

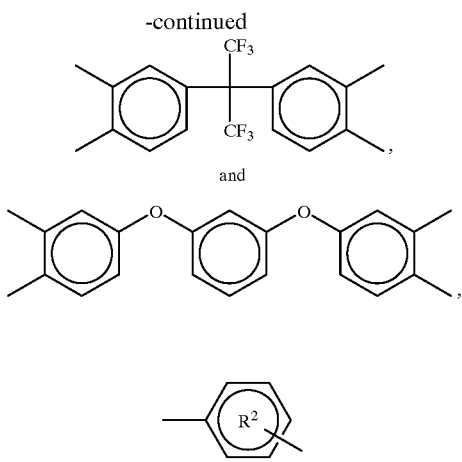

must include one or more of dianiline groups comprising polyalicyclic structures as represented by

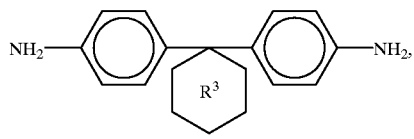

and may contain the following bivalent group,

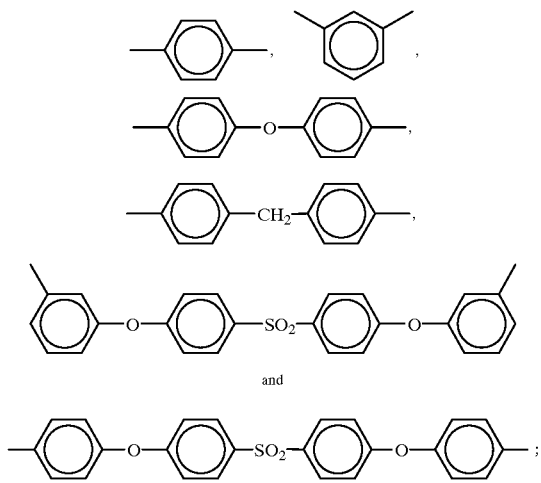

wherein, R³ represents

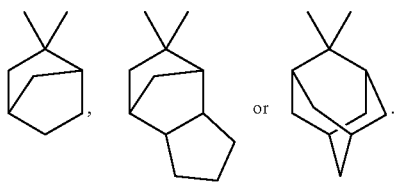

2. A polyimide resin according to claim 1, wherein the inherent viscosity of said polyimide resin is in the range of 0.2~1.1 dL/g.

3. A polyimide resin according to claim 1, wherein the average molecular weight of said polyimide resin is in the range of 50,000~200,000 g/mol.

4. A polyimide resin according to claim 1, wherein the glass transition temperature of said polyimide resin is in the range of 260~410° C.

5. A polyimide resin according to claim 1, wherein said polyimide resin is soluble at room temperature in a solvent or co-solvent selected from the group consisting of dimethylacetamide, dimethylformamide N-methyl-2-pyrrolidone, acetone, ethyl acetate, tetrahydrofuran, chloroform, m-cresol, and γ-butyrolactone.

6. A process of preparing a polyimide resin having formula 1 as repetitive unit by means of solution polymerization of aromatic tetracarboxylic dianhydride and diamine compounds, which comprises:

said aromatic tetracarboxylic dianhydride is selected from one or more of the group consisting of pyromellitic dianhydride, benzophenonetetracarboxylic dianhydride, oxydiphthalic anhydride, biphenyltetracarboxylic dianhydride, hexafluoroisopropylidene diphthalic dianhydride, and hydroquinonebisphthalic dianhydride; and said aromatic diamine compound consisting essentially of one or more of substituted cyclohexylidenedianiline derivatives of formula 2, and optionally comprising a mixture having one ore more compounds selected from the group consisting of oxydianiline, methylene dianiline, metabisaminophenoxy diphenylsulfone, and parabisaminophenoxy diphenylsulfone:

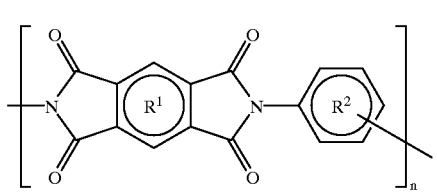
(1)

wherein, the substituents as represented by wherein:

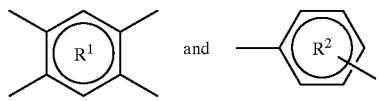

have been previously defined in claim 1,

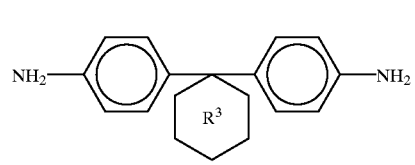
(2)

wherein, R³ represents

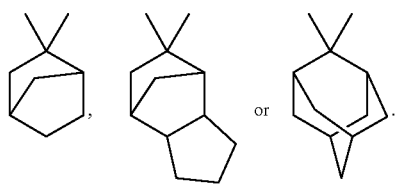

* * * * *